(12) United States Patent
Vu et al.

(10) Patent No.: US 8,438,309 B2
(45) Date of Patent: May 7, 2013

(54) METHOD TO SUPPORT RAPID INTER BASE STATION HANDOFFS IN IP BASED WIRELESS NETWORKS

(75) Inventors: Hai Vu, Fremont, CA (US); Shih-Chun Chang, Santa Clara, CA (US); Sreekant Nair, Sunrise, FL (US); Shashidhar R. Gandham, Fremont, CA (US)

(73) Assignee: xG Technology, Inc., Sarasota, FL (US)

( * ) Notice: Subject to any disclaimer, the term of this patent is extended or adjusted under 35 U.S.C. 154(b) by 107 days.

(21) Appl. No.: 13/271,345

(22) Filed: Oct. 12, 2011

(65) Prior Publication Data

US 2012/0087342 A1    Apr. 12, 2012

Related U.S. Application Data

(60) Provisional application No. 61/404,937, filed on Oct. 12, 2010.

(51) Int. Cl.
*G06F 15/16* (2006.01)

(52) U.S. Cl.
USPC .......... 709/245; 370/331; 370/338; 455/433; 455/435.1

(58) Field of Classification Search .................. 709/245
See application file for complete search history.

(56) References Cited

U.S. PATENT DOCUMENTS

| | | | | |
|---|---|---|---|---|
| 6,988,146 | B1 * | 1/2006 | Magret et al. | 709/238 |
| 7,046,647 | B2 * | 5/2006 | Oba et al. | 370/331 |
| 7,222,192 | B2 * | 5/2007 | Allison et al. | 709/245 |
| 7,492,736 | B2 * | 2/2009 | Ho | 370/329 |
| 7,599,323 | B2 * | 10/2009 | Chandranmenon et al. | 370/328 |
| 7,720,476 | B2 * | 5/2010 | Narayanan et al. | 455/435.1 |
| 7,860,067 | B2 * | 12/2010 | Na et al. | 370/338 |
| 2005/0018677 | A1 * | 1/2005 | Lee et al. | 370/389 |
| 2005/0198384 | A1 * | 9/2005 | Ansari et al. | 709/245 |
| 2008/0112370 | A1 * | 5/2008 | Kwon | 370/336 |
| 2008/0192708 | A1 * | 8/2008 | Gandham | 370/336 |
| 2009/0310560 | A1 * | 12/2009 | Gandham et al. | 370/331 |
| 2010/0088400 | A1 * | 4/2010 | Andreasen et al. | 709/223 |

* cited by examiner

*Primary Examiner* — Tauqir Hussain
(74) *Attorney, Agent, or Firm* — Dennis L. Cook, Esq.

(57) ABSTRACT

A method that allows for rapid inter base station handoffs in IP based wireless networks is disclosed. More specifically a technique to address the problem of accurate location management during rapid handoff across multiple base stations is described in this invention disclosure. The idea proposed uses a combination of Timestamp and Sequence number along with a message exchange protocol over the network to maintain the registration with only a single base station at any point of time.

1 Claim, 1 Drawing Sheet

Incorrect Registration Removal due to Rapid handoffs and network conditions

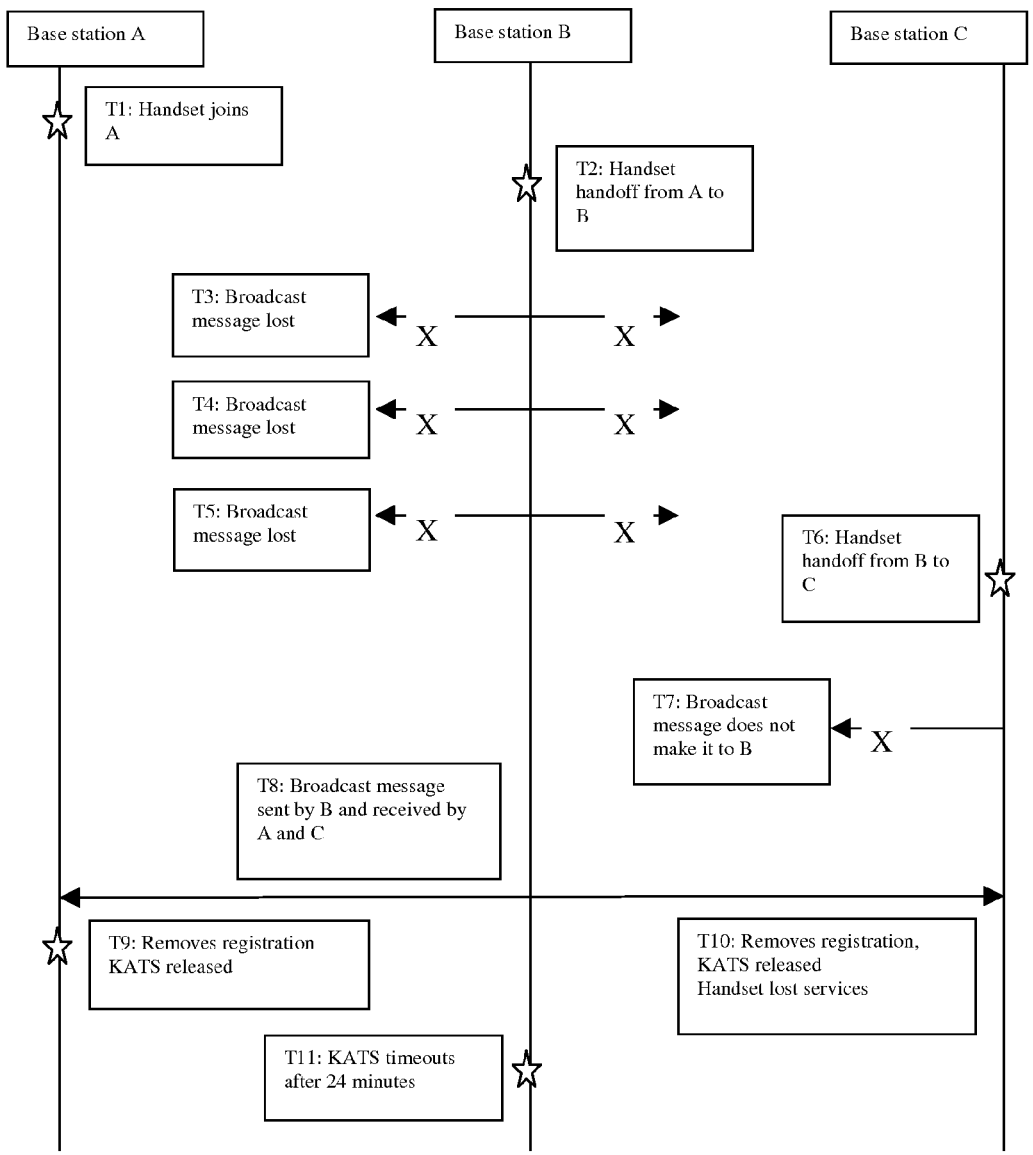
Incorrect Registration Removal due to Rapid handoffs and network conditions

METHOD TO SUPPORT RAPID INTER BASE STATION HANDOFFS IN IP BASED WIRELESS NETWORKS

CROSS-REFERENCE TO RELATED APPLICATION

The present application claims the benefit of previously filed co-pending Provisional Patent Application, Ser. No. 61/404,937 filed Oct. 12, 2010.

FIELD OF THE INVENTION

This invention addresses the need for a method that allows for rapid inter base station handoffs in IP based wireless networks. More specifically it is a technique to address the problem of accurate location management during rapid handoff across multiple base stations. The idea proposed uses a combination of Timestamp and Sequence number, and a message exchange protocol over the network to maintain the registration with only a single base station at any point of time.

BACKGROUND OF THE INVENTION

The invention disclosed in this application uses any type modulation and more particularly is shown in the preferred embodiment using a method of modulation now known by its commercial designation, xMax. This new wireless physical layer technology developed by xG Technology Inc., referred to as xMAX, enables extremely low power Omni-directional transmissions to be received in a wide area. Using xMAX, significant bandwidth can be made available for supporting various wireless applications. Voice Over IP (VoIP) based cellular services have now been developed using xMAX. In xMAX-based cellular networks both the base station and the handsets are equipped with an xMAX transceiver. A mobile device (xMAX handset) in such a network is free to move in an area covered by multiple xMAX base stations. Although this method of rapid inter base station handoffs between differing wireless broadband networks is disclosed in the preferred embodiment as being used in these types of integer cycle and pulse modulation systems it can be implemented on any broad band wireless technologies like WiMax, WiBro, Wi-Fi, 3GPP and HSDPA, or any other type of wired or wireless voice or data systems.

A heterogeneous MAC protocol proposed to support VoIP traffic in xMAX wireless networks has been discussed in previously filed patent applications. In the heterogeneous MAC protocol described in these applications, guaranteed timeslots are assigned to forward VOIP packets, temporary timeslots are assigned to forward data packets and contention based access is used to exchange control messages. Note that this heterogeneous MAC protocol is used here as a reference protocol and similarly xMAX as a reference wireless network. The idea of a rapid inter base station handoff method for IP based wireless broadband networks as described herein can be used in other relevant systems.

BRIEF SUMMARY OF THE INVENTION

The invention disclosed in this application was developed for and is described in the preferred embodiment as being used in any integer cycle or impulse type modulation and more particularly a method of modulation known by its commercial designation, xMAX, but can be implemented on Wi-Fi, 3GPP, HSDPA or any other type of wired or wireless voice or data systems.

As mobile devices handoff across cell sites that are controlled by different base stations, it is imperative to keep track of the handset location for multiple reasons, the most two important being:
1. Maintaining high QOS by routing media accurately to prevent any loss of audio as the handsets roam across cell sites.
2. Receiving incoming calls accurately and with minimal latency.

Wireless channel conditions can fluctuate rapidly thereby forcing the handset to perform handoffs across multiple base stations quite quickly. Therefore the above becomes even more imperative to minimize broadcast traffic and even prevent a break down of the network. In this disclosure, a novel scheme to update the handset's location with the network is proposed whereby the Router now knows the current location and the old base station also removes its own registration entry for this handset.

Therefore it is an object of this invention to have a technique to address the problem of accurate location management during rapid handoff across multiple base stations as described in this disclosure. The idea proposed uses a combination of Timestamp and Sequence number, and a message exchange protocol over the network to maintain the registration with only a single base station at any point of time.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which:

FIG. 1 is a diagram showing an incorrect registration removal procedure due to rapid handoffs.

DETAILED DESCRIPTION OF THE INVENTION

In wireless wide area cellular (& cellular like) systems, mobility of devices across cells served by different base stations is a major characteristic of the network. xMax networks are comprised of mobile handsets that register with base stations, which provide access to the internet via the mobile switching centre (MSC). Network planners deploy cells with overlap zones, which are designed to ensure smooth handoffs across cells. Mobile devices are capable of moving quite fast and hence can move from one cell to another within an extremely short span of time. In this case the handoff is defined as an "inter-base-station handoff" (Inter-BTS handoff). xMax handsets can handoff from one base station to another as rapidly as within half a second. Performing handoffs at such a pace poses some challenges for the network.

An Inter Base Station handoff can happen while an active media session is in progress. In this case, the router/gateway should now route the incoming media from the Internet to the new base station. Any traffic sent to the old base station will be lost thereafter. Therefore it is important to let the network know that the handset is now registered with the new base station.

Traditional cellular networks track handsets to deliver signaling messages by the process of Paging. On the contrary, xMax networks employ a Paging-less methodology by exploiting the ARP cache of the Router at the MSC to accurately locate a handset (the exact details of this mechanism are available in a separate patent application referenced above). Whenever a handset powers up and registers with a base station, the base station informs the router which creates an entry in its ARP cache with the handset's IP address and the base station MAC address.

During an Inter Base Station handoff this association will change to the new base station. Accordingly the new base station updates the router's ARP cache with its MAC address. In the unlikely event that this message is delayed or lost in the network, and if the Router's ARP cache entry expires within this window and issues an ARP request, it is possible that both the current and previous base station will respond. Therefore, it is vital that when a handset registers with a new base station the old base station removes the registration entry of the handset.

The solution to the above problem is to issue a Registration Removal message from the new base station to the previous base station with the handset's information. The following are the steps performed by the new Base Station whenever a handset performs an Inter-Base Station Handoff (normal or during a voice call).

A handset registered with a base station hands-off to another base station.
  The new base station broadcasts a layer 2 Registration Removal Request message containing the IP and MAC address of the handset and MAC address of the current Base Station. All base stations within the same subnet receive this message.
  On receiving a Registration Removal request the base station compares the handset's IP and MAC address within the Registration Table. If it is present the registration entry is removed. If it is not present the message is ignored.

The link between base stations and the MSC may be implemented using a variety of networking equipment depending on the available infrastructure at the deployed location. Therefore, there is a non-zero probability that the Registration Removal Request may be lost in the network and may not reach the original base station. In order to provide a greater degree of reliability the new base station will re-transmit the request several times. Also, the old base station will send an acknowledgement that it has removed the Registration. The new base station stops re-transmitting on receiving the acknowledgement or after a fixed number of attempts. This scheme provides greater reliability to ensure that the registration is removed at the old base station.

When there are only two base stations involved, the problem is trivial and countered by the above solution. The problem is complicated by the possibility that a handset can move from one base station to another and onward to several other base stations within seconds.

Thus, the above-described solution will fail in the following scenario. Assume a network of three base stations, A, B and C and a handset H that is initially registered with base station A. Because of network conditions, H might decide to handoff from A to B, and then within a short period of time handoff again from B to C. Ideally, only base station C should have maintained information about the handset H. However, it is possible that C receives the REGISTRATION REMOVAL REQUEST message from B after the handset hands off from B to C. In this case, C will falsely remove H's information and thereafter will not be able to provide services to H. The handoff is considered a failure. FIG. 1 illustrates the handoff failure in detail.

A novel solution for inter-base-station handoff so that a handset can perform multiple rapid handoffs from one base station to another seamlessly regardless of network conditions follows below.

The problem depicted in FIG. 1 arises because base station C could not recognize that the Registration Removal Request from B was a stale request. To enable base stations to identify stale requests one uses a combination of a base station's timestamp and a handoff sequence number. The handoff sequence number will be incremented by the handset each time it hands-off to a new base station.

This solution makes the following reasonable assumptions:

Assume that all the base stations within a network are synchronized in time using GPS with millisecond resolution. Therefore the difference in timestamps between two base stations will not be greater than 1 second. [$\Delta t = |t_{BTS1} - t_{BTS2}| <= 1$ second].
  Assume that the time it takes for a handset to reset, reboot and join the network (typically handsets take several seconds to reboot) is no less than '$\Delta t$'.
  Assume that a handset always maintains a non-negative handoff sequence number, starting from 0. Whenever a handset hands off to a new base station, the number is incremented. If for any reason the handset is restarted, then the number is reset to 0.
  Assume that within DELTA_TIME seconds, the highest number of handoffs a handset can perform is no greater than MAX_HANDOFF_IN_DELTA_TIME The rationale behind using the combination of timestamp and handoff sequence number is as follows:

Ideally, if all base stations are perfectly synchronized, then one just needs to use a timestamp to decide on which base station the handset is located. If a base station finds that the timestamp in the message is greater than the timestamp it maintains about a handset, then that means the handset has moved to another base station.
  Practically, however, all base stations are not perfectly synchronized. Hence, if the timestamp difference between two base stations is less than a threshold DELTA_TIME, then we need a second parameter, which is "Handoff Sequence Number", to decide which base station the handset is registered with. In this case, one can safely conclude that the handset is with the base station whose handoff sequence number is newer.

The new handoff scheme works as follows:

The base station maintains a timestamp of the last handset system access activity. The timestamp can be set based on any uplink message received from the handset (for example, control messages). The base station also maintains a handoff sequence number related to a handset, which is received directly from the handset.
  When a handset hands off to a new base station, it increments the handoff sequence number and includes this number in a Handoff Request message.
  When the new base receives the handset's handoff request, it will save the timestamp and handoff sequence number.
  The new base station will then broadcast a REGISTRATION REMOVAL REQUEST message containing the following information:
    MAC address of the new base station;
    The IP address of the handset;
    The MAC address of the handset;
    The timestamp (let us call this Timestamp$_{New}$); and,
    Handset's handoff sequence number (let us call this Sequence$_{New}$).

Upon receiving a REGISTRATION_REMOVAL_REQUEST message, a base station checks for the following conditions:
  If the MAC address of the base station in the message matches its MAC address, then ignore the message.
  If the base station does not find any information related to the IP address and MAC address of the handset, then ignore the message.
  When the handset's timestamp and sequence number maintained by a base station is $Timestamp_{Current}$ and $Sequence_{Current}$ then the base station will de-register the handset and sends a REGISTRATION_REMOVAL_REPLY message to the new base station if:
    $Timestamp_{New} - Timestamp_{Current} > DELTA\_TIME$, or
    $|Timestamp_{Current} - Timestamp_{New}| \leq DELTA\_TIME$ and $Sequence_{New} - Sequence_{Current}| \leq MAX\_HANDOFF\_IN\_DELTA\_TIME$
  The base station can ignore the message otherwise.

Since certain changes may be made in the above described method that allows for rapid inter base station handoffs in IP based wireless networks without departing from the scope of the invention herein involved, it is intended that all matter contained in the description thereof or shown in the accompanying shall be interpreted as illustrative and not in a limiting sense.

What is claimed is:

1. A method of rapid registration hand-off of a mobile handset between two or more base stations having registered mobile handsets in a network comprising:
  each of said two or more base stations being synchronized in time;
  each of said registered mobile handsets maintaining a non-negative sequence number;
  one of said two or more base stations having said registered mobile handsets assigned to said base station maintaining a timestamp of the most recent activity of said registered mobile handsets;
  said base station also receiving from said registered mobile handset and storing said registered mobile handset's non-negative sequence number;
  when said registered mobile handset hands off to a new base station of said two or more base stations said handing off mobile handset increments the non-negative sequence number and transmits said incremented non-negative sequence number to said new base station and said new base station stores a registration timestamp and said incremented non-negative sequence number received from said handing off mobile handset;
  said new base station then transmitting a handset registration removal request containing a MAC address of said new base station and an IP address and a MAC address of said handing off mobile handset along with said registration timestamp and said incremented non-negative sequence number to said two or more base stations in a network;
  then each of said two or more base stations receiving said handset registration removal request and comparing the MAC address of said new base station and if said MAC address matches said new base station ignoring said transmitted handset registration removal request;
  wherein each of said two or more base stations comparing said IP address and MAC address of said handing off mobile handset with said two or more base stations' registered mobile handsets and if no match is found ignoring said transmitted handset registration removal request; and
  if a base station of said two or more base stations determines that the IP address and a MAC address of said handing off mobile handset identified in said registration removal request is one of said base station's registered mobile handsets, said base station deregisters said mobile handset and transmits a registration removal reply if the timestamp in the registration removal request is larger by a predetermined threshold than the timestamp stored for said mobile handset or the timestamp stored minus the timestamp in the registration removal message is greater than or equal to said certain threshold and the incremented non-negative sequence number sent in said registration removal request minus the non-negative sequence number stored by said base station is less than or equal to the maximum amount of handoffs capable of being made by a handset within said predetermined threshold.

* * * * *